(No Model.)

W. MICHALK.
METALLIC PACKING RING.

No. 535,713. Patented Mar. 12, 1895.

Witnesses:
H. K. Boulter
O. S. Northrup

Inventor:
Wilhelm Michalk,
By Wm. E. Boulter
Attorney

UNITED STATES PATENT OFFICE.

WILHELM MICHALK, OF DEUBEN, GERMANY.

METALLIC PACKING-RING.

SPECIFICATION forming part of Letters Patent No. 535,713, dated March 12, 1895.

Application filed May 31, 1894. Serial No. 513,033. (No model.)

*To all whom it may concern:*

Be it known that I, WILHELM MICHALK, a subject of the King of Saxony, residing at Deuben, near Dresden, in the Kingdom of Saxony, in the German Empire, have invented certain new and useful Improvements in Metallic Packing-Rings, of which the following is a specification.

This improvement has for its object to obviate the rupture of the packing-rings hitherto used which are made of cast, tubular or sheet metal, and also to decrease the high cost of manufacture.

The accompanying drawings illustrate the new metallic packing-rings.

Figure 1:
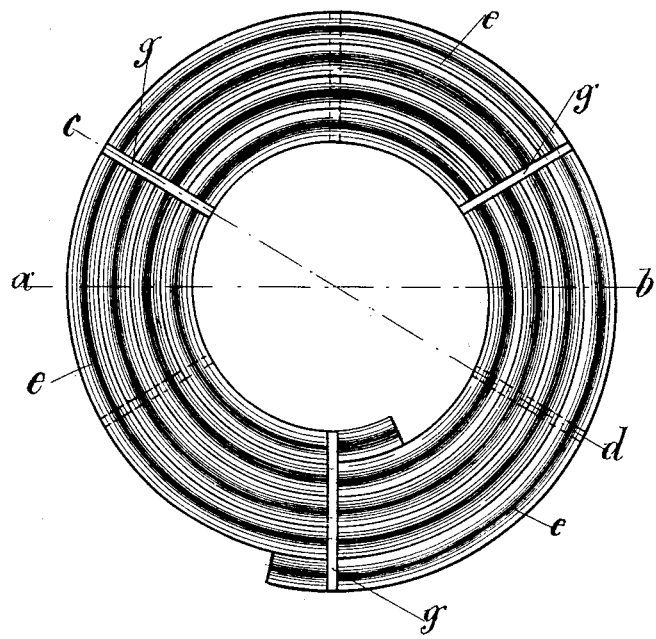
Figure 2:
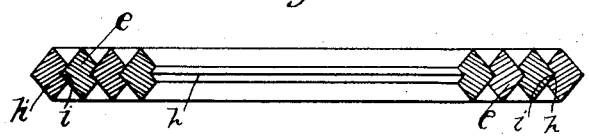
Figure 3:
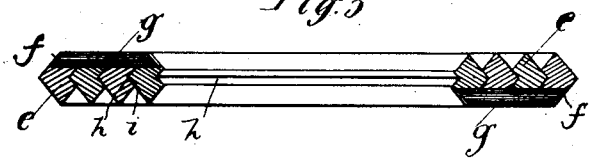
Figure 4:
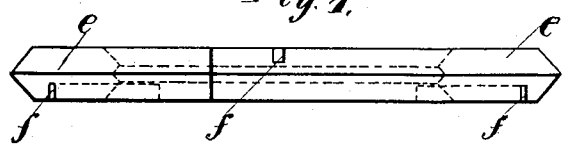

Figure 1 is a view as seen from above. Fig. 2 is a cross-section of Fig. 1 on the line $a-b$. Fig. 3. is a cross-section of Fig. 1 on the line $c-d$. Fig. 4 is a side elevation of the ring.

The improved packing ring is made of preferably drawn wire of any suitable section, formed into a coil so that the successive convolutions $e$ of the packing lie side by side, until the required number of ribs and breadth of ring are obtained. As will be seen the wire is shown to be coiled in the form of a spiral.

For the purpose of securing together the spiral convolutions of a coil, or the series of concentric rings, which constitute the packing, so that they may press firmly against each other radial binding strips $g$, are fitted into grooves $f$, formed preferably in opposite sides of the packing as indicated in Fig. 3.

The entire ring after the binders $g$, have been applied, is immersed in a bath of molten tin, whereby the whole surface is tinned over and the coils $e$, are soldered together as well as to the binders $g$.

The coils or convolutions or rings of the wire may be provided with grooves $h$, in their inner faces to adapt the same to receive the angular edges $i$ of the adjacent rings or convolutions when the latter are assembled, as seen in Figs. 2 and 3.

This packing ring is suitable for various purposes and is durable, easily and cheaply made, and may be constructed of any desired size.

I claim and desire to secure by Letters Patent—

1. The herein described packing-ring made of wire and comprising a series of rings or convolutions $e$, provided with radial grooves $f$, and binding strips $g$, seated in said grooves as and for the purpose specified.

2. The herein described packing-ring made of wire and comprising a series of rings or convolutions $e$, provided with radial grooves $f$, and binding strips $g$, seated in said grooves, and soldering for securing said parts together as specified.

3. The herein described packing-ring made of wire and comprising a series of rings or convolutions $e$, provided with radial grooves $f$, and each being provided with a groove $h$ in its inner face within which groove is seated the edge $i$, of an adjacent ring or convolution, and binding strips $g$, seated in the grooves $f$, as and for the purpose specified.

In testimony whereof I have hereunto set my hand in presence of two witnesses.

WILHELM MICHALK.

Witnesses:
RUD. SCHMIDT,
HERNANDO DE SOTO.